US006435451B1

(12) United States Patent
Leonhardt

(10) Patent No.: US 6,435,451 B1
(45) Date of Patent: Aug. 20, 2002

(54) COMPLIANT TAPE REEL FLANGES

(75) Inventor: Michael L. Leonhardt, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 1 day.

(21) Appl. No.: 09/691,880

(22) Filed: Oct. 19, 2000

(51) Int. Cl.⁷ .............................................. B65A 75/14
(52) U.S. Cl. ..................................................... 242/614
(58) Field of Search ............................. 242/614, 614.1, 242/118.4, 345

(56) References Cited

U.S. PATENT DOCUMENTS

| 2,973,159 A | * | 2/1961 | Kulka ........................ 242/71.8 |
| 3,099,414 A | | 7/1963 | Kulka |
| 3,342,435 A | | 9/1967 | Gelardi et al. |
| 3,819,124 A | | 6/1974 | Marks et al. |
| 4,065,075 A | | 12/1977 | Holcomb |
| 4,541,588 A | | 9/1985 | Sato |
| 5,377,066 A | | 12/1994 | Katagiri |
| 5,418,671 A | | 5/1995 | Schoettle et al. |
| 5,699,973 A | * | 12/1997 | Nakane et al. .............. 242/345 |
| 5,826,811 A | | 10/1998 | Melbye et al. |

* cited by examiner

Primary Examiner—Donald P. Walsh
Assistant Examiner—Mark J. Beauchaine
(74) Attorney, Agent, or Firm—Brooks & Kushman P.C.

(57) ABSTRACT

A reel for holding tape includes a hub with a cylindrical surface about which the tape is wound to form a tape pack. Flanges are fixed to either end of the hub, forming parallel inner surfaces. At least one of the inner surfaces has a compliant raised pattern. The raised pattern provides one or more of a plurality of compliant tape contacting surfaces providing an aligning forced to the tape edge as the tape edge is wound into the tape pack, channels allowing air to escape from between the tape and the tape pack as the tape is wound into the tape pack, and compliant sides reducing the possibility for damage to tape in the tape pack due to shock received by the reel.

29 Claims, 2 Drawing Sheets

COMPLIANT TAPE REEL FLANGES

TECHNICAL FIELD

The present invention relates to reels used for holding packs of tape in information storage systems.

BACKGROUND ART

Tape, such as magnetic tape or optical tape, is commonly used to store information due to its reliability, cost efficiency, and ease of use. Tape may be made more useful and cost-effective by increasing the density of information stored and decreasing the time required to access this information. Tape may be made wider and data tracks written on the tape narrower to increase the real density of information stored on the tape. Tape may be made thinner to increase the volume of information stored on a given reel of tape. Tape may be moved past the tape head faster to increase the rate of information transferred. Tape paths may be shortened to decrease access time, decrease costs, and decrease the size and complexity of tape access systems. These factors generally necessitate an increase in performance from all elements in a tape system.

Tape is typically wound on one or two reels in a protective housing, such as a cassette or cartridge. A reel typically includes a cylindrical hub about which tape is wound to form a tape pack. Flanges are typically attached to either end of the hub and extend beyond the tape pack to guide and protect the tape. The spacing between flanges is greater than the width of the tape to allow for manufacturing tolerances in flange spacing, tape width and the planarity of various guide elements of the tape path as well as to avoid damaging the tape edges. Hence, as the tape is wound onto the hub, uneven wrapping known as stagger wrap or pack shift may result. Stagger wrap and tape shift cause the tape to enter the tape path at varying elevations. This creates problems for accurately guiding the tape within the tape transport path as well as creating the potential for excessive tape edge-to-tape guide contact, resulting in tape edge damage. Since many tape paths use one or both tape edges as a physical positioning reference, tape edge damage degrades the ability of the tape drive to alight read/write heads with magnetic tracks on the tape, ultimately degrading data integrity.

These problems are worsened by higher tape speeds, wider tapes, thinner tapes, smoother tapes, or more flexible tapes due, in part, to the build up of air films between wrap layers. Additional problems may result from impacts to the tape storage container that are transmitted through the flanges to the tape pack. Tape edges protruding beyond the tape pack may be subject to bending, kinking, or other forms of mechanical damage.

What is needed is an improved tape reel. The tape reel should accurately guide tape into the tape pack without damaging tape edges. The tape reel should also compensate for any manufacturing variances in reel construction, tape width, and the tape transport system. The tape reel should cushion shock received by the tape housing. The tape reel should physically stabilize the tape pack during long term archive storage. The tape reel should be economical to produce and should operate in existing housings and with existing tape transport systems.

DISCLOSURE OF INVENTION

It is an object of the present invention to provide an aligning force to tape as it spools and unspools.

It is another object of the present invention to permit trapped air to bleed out from between tape layers in a tape pack.

It is still another object of the present invention to minimize the effect of manufacturing tolerances in a tape reel, tape, and tape transport system.

It is yet another object of the present invention to provide protection to a tape pack from mechanical shock.

It is a further object of the present invention to physically stabilize the tape pack during long term archival storage.

In carrying out the above objects and other objects and features of the present invention, a reel for holding tape is provided. The reel includes a hub with a cylindrical surface about which the tape is wound to form a tape pack. Flanges are fixed to either end of the hub, forming parallel inner surfaces. At least one of the inner surfaces has a compliant raised pattern. In various embodiments, the raised pattern may include ridges extending radially from the hub outward, segments extending radially from the hub across a portion of the flange inner surface, or a plurality of blisters.

In an embodiment of the present invention, the raised pattern is made from at least one embossed polymer sheet. In another embodiment, the raised pattern is formed on the flange inner surface.

In an aspect of the present invention, the raised pattern defines a plurality of compliant tape contacting surfaces providing an aligning forced to the tape edge as the tape edge is wound into the tape pack. In another aspect of the present invention, the raised pattern defines a plurality of channels allowing air to escape from between the tape and the tape pack as the tape is wound into the tape pack. In still another aspect of the present invention, the raised pattern defines a plurality of compliant sides reducing the possibility for damage to the tape in the tape pack due to shock received by the reel.

A liner surface for a tape reel having two parallel flanges separated by a cylindrical hub is also provided. The liner surface is positioned between the tape pack and either or both of the tape flanges. The liner surface covers the surface of the flange extending over the tape pack. The liner surface has a raised pattern separating the pack from the flange.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
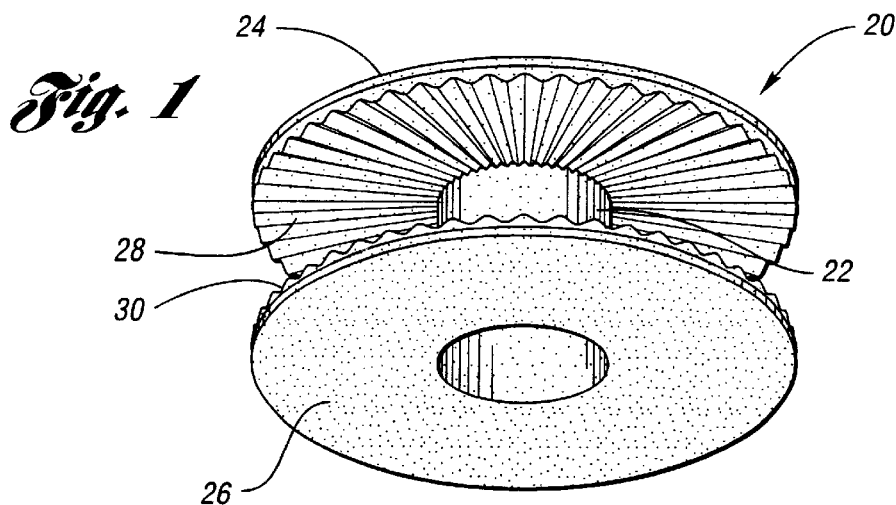
FIG. 1 is a drawing of a tape reel according to an embodiment of the present invention.

Referring to FIG. 1, a drawing of a tape reel according to an embodiment of the present invention is shown. A tape reel, shown generally by 20, has a cylindrical hub 22 separating top flange 24 and bottom flange 26 substantially parallel to each other and normal to the axis of hub 22. Top flange 24 has associated top flange inner surface 28 and bottom flange 26 has associated bottom flange inner surface 30. As described below, top flange inner surface 28 and bottom flange inner surface 30 may be part of top flange 24 and bottom flange 26, respectively, or may be provided by liners.

Figure 2:
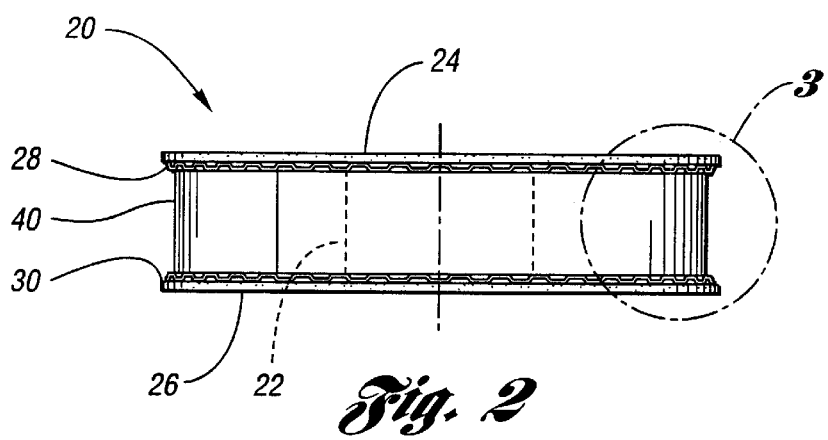
FIG. 2 is a drawing of a tape pack on a tape reel according to an embodiment of the present invention.

Referring now to FIG. 2, a drawing of a tape pack on a tape reel according to the present invention is shown. Tape pack 40 is wound around hub 22. At least one flange 24, 26 has a compliant inner surface 28, 30. Compliant inner surface 28, 30 keeps wrapping of tape pack 40 uniform and unstaggered by gently contacting the edges of tape to provide an aligning force as the tape spools onto or unspools from tape pack 40. Since the forces creating uneven wraps in tape pack 40 are not strong, only a light contact between the tape and flange inner surface 28, 30 is required to hold the tape in position while air that is trapped bleeds between layers of tape in tape pack 40.

There are further benefits accrued by compliant flange inner surface 28, 30. First, during tape cartridge storage, uneven tape wrap tensions within the tape pack equalize and create stagger wrap and pack slip displacements. This can be further exacerbated by environmental changes such as temperature, humidity, and the like. The force of one or more compliant flange inner surfaces 28, 30 serves to minimize this effect. Second, greater tolerance to misalignment between a tape transport path and flanges 24, 26 can be achieved by increasing the space between flanges 24, 26 and compensating for this increased spacing with the compliant raised pattern on flange inner surfaces 28, 30. Third, an increased level of mechanical shock protection is provided by the absorbing properties of compliant flange inner surfaces 28, 30. Fourth, an increased tolerance to transient air films between tape layers in tape pack 40 allows the use of smoother tape back coats which in turn results in a smoother recording surface from decreased layer-to-layer tape imprinting. This results in reduced head to media separation and enables the use of higher linear recording densities.

Figure 3:
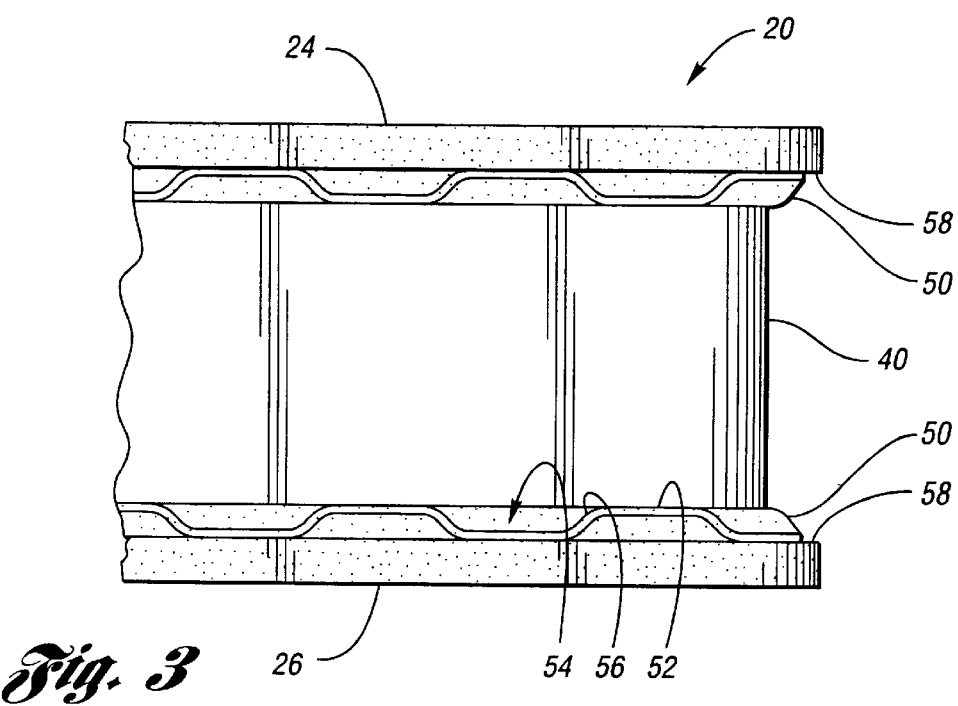
FIG. 3 is an illustration of flange liner surfaces according to an embodiment of the present invention.

Referring now to FIG. 3, an illustration of flange liner surfaces according to an embodiment of the present invention is shown. Either or both of top flange 24 and bottom flange 26 may incorporate liner 50 to achieve compliant inner surface 28, 30. Liner 50 defines a raised pattern separating tape pack 40 from the remainder of flange 24, 26. Liner 50 defines a plurality of tape contacting surfaces, one of which is indicated by 52, providing an aligning force to the tape edge as the tape is wound into tape pack 40. Channels, one of which is indicated by 54, allow air to escape from between tape and tape pack 40 as the tape is wound into tape pack 40. Compliant sides, one of which is indicated by 56, reduce the possibility for damage to tape in tape pack 40 due to shock received by reel 20. Typically, compliant sides 56 form the transition between tape contacting surfaces 52 and channels 54.

Liner 50 may be made from a variety of materials but is preferably constructed of at least one embossed polymer sheet. Possible polymer sheet material includes polyethylene; polypropylene; polyetherketones and variants such as polyethersulfones, polyetherimides, polysulfones, and polyarylsulfides; a polyaramide film such as Kevlar®; and, preferably, a polyimide film such as Kapton®, available from E. I. du Pont de Nemours of Wilmington, Del. Any sheet material that can be properly formed into the raised pattern may be used. Preferably, the sheet material should resist wear from contact with the tape to prevent generating particles that may interfere with the interface between the tape and the tape head. If multiple sheets are used, they may be formed into a laminate prior to forming the raised pattern or may be formed with the raised surface and then attached. Liner 50 may be attached to flange 24, 26 using a variety of known means. An epoxy may be used. Alternatively, an adhesive such as a cyanoacrylate-based, bismaleimide-based, or the like may be used. An adhesion promoter, such as amino propyltriethoxysilane may be applied to either liner 50 or flanges 24, 26 prior to adhesion or may be mixed into the adhesive as is known in the art. Liner 50 may also be mechanically fixed to flange 24, 26.

The thickness of sheeting from which liner 50 is made depends on the material used, desired compliancy, and construction of flanges 24, 26. Typical thicknesses fall within a range of 20 mm and 200 mm. Raised patterns in liner 50 may be created by embossing, stamping, molding, etching, or any other permanent formation operation. The height of raised patterns also depends on factors including the materials used for liner 50, tape characteristics, and usage of reel 20. A typical range for the height of the raised pattern is between 0.1 mm and 1 mm.

As an alternative to using liner 50, inner flange surfaces 58, may be formed to provide the compliant raised pattern liner surface. For example, flange 24, 26 may be molded from a plastic material in a process that microinjection molds features 52, 54, 56 onto flanges 24, 26. Alternatively, a plurality of microinjection molded polymer elements may be adhered to flange surfaces 28, 30. Flange surfaces 28, 30 can also be coated with a polymer film and then etched to form features 52, 54, 56 in a process similar to those used in the manufacturing of thick film or thin film electronic circuits.

Figure 4:
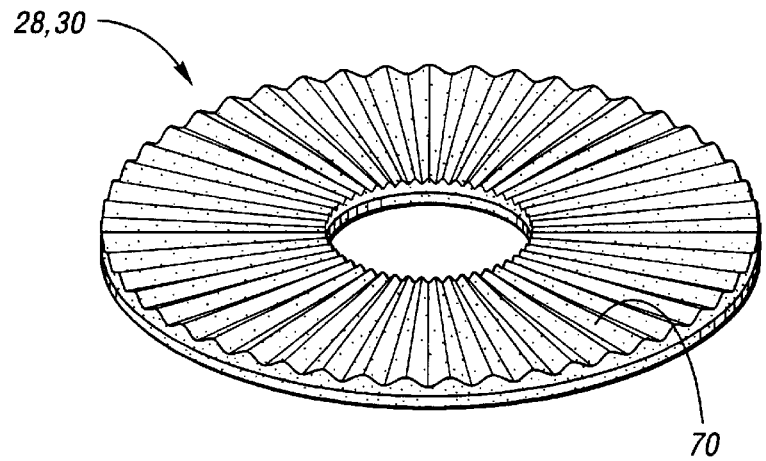
FIG. 4 is an illustration of a raised pattern including ridges extending radially across a flange surface according to an embodiment of the present invention.

Referring now to FIG. 4, an illustration of a raised pattern including ridges extending radially across a flange inner surface according to an embodiment of the present invention is shown. Ridges, one of which is indicated by 70, extend radially from the hub across flange inner surface 28, 30. Spaces between ridges 70 provide channels 54 for air to escape as tape is wound into tape pack 40.

Figure 5:
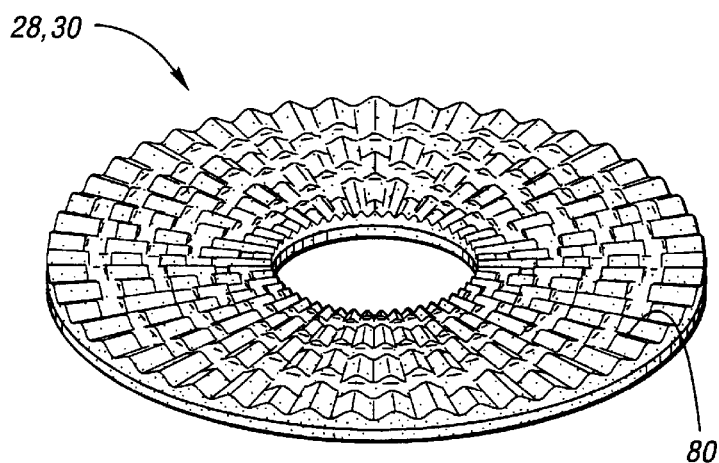
FIG. 5 is an illustration of a raised pattern including radial segments on a flange surface according to an embodiment of the present invention.

Referring now to FIG. 5, an illustration of a raised pattern including radial segments on a flange surface according to an embodiment of the present invention is shown. Each segment, one of which is indicated by 80, extends radially across a portion of flange inner surface 28, 30. Segments 80 may be randomly placed, may appear as separated portions of ridges 70, or may be regularly placed to provide a substantially uniform coverage of segments 80 across flange inner surface 28, 30.

Figure 6:
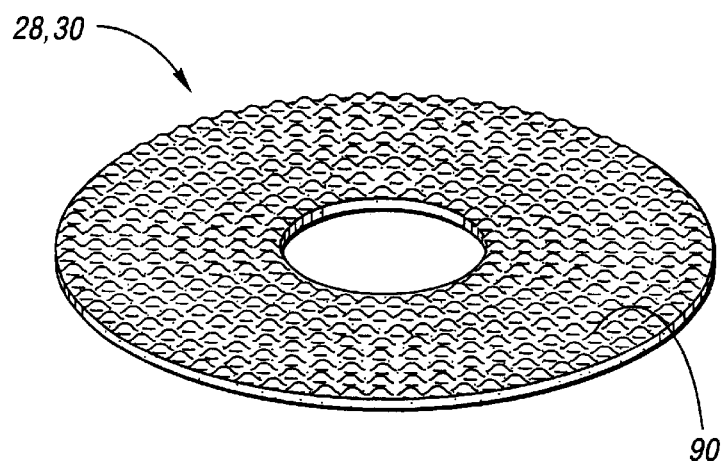
FIG. 6 is an illustration of a raised pattern including blisters on a flange surface according to an embodiment of the present invention.

Referring now to FIG. 6, an illustration of a raised pattern including blisters on a flange surface according to an embodiment of the present invention is shown. Blisters, one of which is indicated by 90, are positioned across the surface of inner flange surface 28, 30. Blisters 90 may be randomly or regularly positioned. Each blister 90 may be a closed pocket or may be partially open.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A liner surface for a tape reel having two parallel flanges separated by a cylindrical hub, tape forming a tape pack as the tape is wound about the hub between the two flanges, the liner surface positioned between the tape pack and one of at least one of the two flanges, the liner surface having an inner edge near the hub and an outer edge near the flange outer edge, the liner surface further having a raised pattern separating the tape pack from the flange.

2. A liner surface as in claim 1 wherein the raised pattern comprises ridges extending radially from the liner surface inner edge to the liner surface outer edge.

3. A liner surface as in claim 1 wherein the raised pattern comprises segments extending radially from the hub, each segment extending for only a portion of the distance between the liner surface inner edge and the liner surface outer edge.

4. A liner surface as in claim 1 wherein the raised pattern comprises a plurality of blisters.

5. A liner surface as in claim 1 wherein the raised pattern has a height between 0.1 millimeters and 1 millimeters above the remaining liner surface.

6. A liner surface as in claim 1 wherein the liner surface is made of at least one embossed polymer sheet.

7. A liner surface as in claim 1 wherein the raised pattern defines a plurality of compliant tape contacting surfaces, the plurality of contacting surfaces providing an aligning force to the tape edge as the tape is wound into the tape pack, thereby reducing staggered wrap.

8. A liner surface as in claim 1 wherein the raised pattern defines a plurality of channels, the plurality of channels promoting the escape of air from between the tape and the tape pack as the tape is wound into the tape pack.

9. A liner surface as in claim 1 wherein the raised pattern defines a plurality of compliant sides, the plurality of compliant sides reducing the possibility for damage to tape in the tape pack due to shock received by the reel.

10. A liner surface as in claim 1 wherein the liner surface comprises a compliant sheet covering the surface of the flange extending over the tape pack.

11. A liner surface for a tape reel having two parallel flanges separated by a cylindrical hub, tape forming a tape pack as the tape is wound about the hub between the two flanges, the liner surface positioned between the tape pack and one of the flanges, the liner surface comprising a plurality of raised features, each feature having a compliant tape contacting surface supported by compliant sides, wherein the contacting surface provides an aligning force to the tape edge as the tape is wound into the tape pack and the compliant sides reduces the possibility for damage to tape in the tape pack due to shock received by the reel, the raised features spaced so as to form channels promoting the escape of air from between the tape and the tape pack as the tape is wound into the tape pack.

12. A liner surface as in claim 11 wherein each raised feature is a ridge extending radially from the liner surface inner edge to the liner surface outer edge.

13. A liner surface as in claim 11 wherein each raised feature is a segment extending radially from the hub, each segment extending for only a portion of the distance between the liner surface inner edge and the liner surface outer edge.

14. A liner surface as in claim 11 wherein each raised feature comprises a blister.

15. A liner surface as in claim 11 wherein each raised feature has a height between 0.1 millimeters and 1 millimeter.

16. A liner surface as in claim 11 wherein the liner surface is formed on a thin sheet.

17. A liner surface as in claim 11 wherein the liner surface is formed on at least one flange.

18. A liner surface as in claim 11 wherein each raised feature is embossed on a thin polymer sheet.

19. A tape reel for holding tape comprising:

a hub with a cylindrical surface about which the tape is wound to form a tape pack;

a first flange fixed to a first end of the hub, the first flange having an inner surface; and a second flange fixed to a second end of the hub opposite of the first hub end, the second flange having an inner surface parallel to and facing the first flange inner surface;

wherein at least one of the first flange inner surface and the second flange inner surface comprises a compliant raised pattern.

20. A tape reel as in claim 19 wherein the raised pattern comprises ridges extending radially across the flange inner surface.

21. A tape reel as in claim 19 wherein the raised pattern comprises segments extending radially from the hub, each segment extending for only a portion of the distance across the flange inner surface.

22. A tape reel as in claim 19 wherein the raised pattern comprises a plurality of blisters.

23. A tape reel as in claim 19 wherein the raised pattern has a height between 0.1 millimeters and 1 millimeter.

24. A tape reel as in claim 19 wherein the raised pattern comprises at least one embossed polymer sheet.

25. A tape reel as in claim 19 wherein the raised pattern is formed on at least one of the first flange inner surface and the second flange inner surface.

26. A tape reel as in claim 19 wherein the raised pattern defines a plurality of compliant tape contacting surfaces, the plurality of contacting surfaces providing an aligning force to the tape edge as the tape is wound into the tape pack, thereby reducing staggered wrap.

27. A tape reel as in claim 19 wherein the raised pattern defines a plurality of channels, the plurality of channels allowing air to escape from between the tape and the tape pack as the tape is wound into the tape pack.

28. A tape reel as in claim 19 wherein the raised pattern defines a plurality of compliant sides, the plurality of compliant sides reducing the possibility for damage to tape in the tape pack due to shock received by the reel.

29. A tape reel as in claim 19 wherein the tape reel holds tape in long term archival storage.

* * * * *